United States Patent [19]

Iwamatsu et al.

[11] Patent Number: 5,302,281
[45] Date of Patent: Apr. 12, 1994

[54] METHOD FOR CATALYTIC CRACKING OF PETROLEUM HYDROCARBONS

[75] Inventors: Eiji Iwamatsu; Yasushi Wakushima; Yoshifumi Hiramatsu, all of Sodegaura, Japan

[73] Assignee: Idemitsu Kosan Co., Ltd., Tokyo, Japan

[21] Appl. No.: 909,571

[22] Filed: Jul. 6, 1992

[30] Foreign Application Priority Data

Jul. 16, 1991 [JP] Japan .................................. 3-199784

[51] Int. Cl.$^5$ ......................... C10G 11/02; B01J 21/16
[52] U.S. Cl. .................................... 208/118; 208/119; 208/120; 208/121; 208/122; 208/123; 208/124; 502/80; 502/84
[58] Field of Search ............... 208/118, 119, 120, 116; 502/72, 242; 501/141; 423/331

[56] References Cited

U.S. PATENT DOCUMENTS

| | | |
|---|---|---|
| 73,141 | 3/1983 | Gregory . |
| 4,775,461 | 10/1988 | Harris et al. .................. 208/119 |
| 5,004,716 | 4/1991 | Ogawa .................. 423/331 |

Primary Examiner—R. Bruce Breneman
Assistant Examiner—Bekir L. Yildirim
Attorney, Agent, or Firm—Frishauf, Holtz, Goodman & Woodward

[57] ABSTRACT

Middle distillates can be produced efficiently in high yields by catalytically cracking petroleum hydrocarbons by contacting the petroleum hydrocarbons at cracking conditions with a catalyst composition comprising a cation-exchanged stevensite.

18 Claims, No Drawings

METHOD FOR CATALYTIC CRACKING OF PETROLEUM HYDROCARBONS

BACKGROUND OF THE INVENTION (a) Field of the Invention

The present invention relates to a method for catalytic cracking of petroleum hydrocarbons which is suitable for petroleum refining. It relates particularly to a method suitable for catalytic cracking of petroleum hydrocarbons having relatively high boiling points, for example, hydrocarbon distillates having higher boiling points than those of naphtha distillates, such as naphtha, kerosine, gas oil and atmospheric residue. The method is characterized in the catalysts used therein, which reduce excessive cracking causing the generation of cracked gases, have high selectivity toward middle distillates of higher value, and lose little activity by the steaming during regeneration. The method therefore enables efficient production of various useful hydrocarbon distillates by the catalytic cracking of various petroleum hydrocarbons, and is particularly suitable for efficient catalytic cracking of vacuum gas oils or atmospheric residue to high yields of fuel gasoline distillates (FG), which are useful as automotive fuels, or light cycle oils (LCO), which are useful as mixing components for diesel oils or heavy oils.

Catalytic cracking of petroleum hydrocarbons by fluidized-bed processes or the like is an important technique for petroleum refining. Various processes are employed for the catalytic cracking of petroleum hydrocarbons, and the feed materials and the objective products vary with processes. The most important technique is for the efficient and selective production of high yields of middle distillates of higher value from hydrocarbon distillates having relatively high boiling points, while inhibiting coking or the generation of cracked gases due to excessive cracking. Examples of such a technique are FCC processes for the efficient catalytic cracking of vacuum gas oils or atmospheric residue to a high yield of fuel gasoline distillates (FG) useful as automotive fuels or light cycle oils (LCO) useful as mixing components for diesel oils or heavy oils.

In catalytic cracking of petroleum hydrocarbons, such as the FCC processes, zeolite catalysts have been conventionally used. Zeolite catalysts however have shortcomings of poor hydrothermal resistance, and on contact with steam during catalytic cracking or during steaming at high temperatures for regeneration, their structures are destroyed, and their catalytic activity (conversion) is reduced.

Such a defect of zeolite catalysts is well known and is also apparent from the following examples.

(1) In Sekiyu Gakkaishi, 26, 19 (1983), a considerable reduction in the crystallinity of proton-Y-type zeolites (REY) induced by steaming the zeolites with 100% steam is reported. As a concrete example, it is reported that when a fresh zeolite had a crystallinity of 100, the crystallinity was reduced to 91 by steaming at 730° C. for 6 hours, and to 67 by steaming at 760° C. for 6 hours.

(2) In Ind. Eng. Chem. Prod. Res. Dev., 16, 285 (1977), a considerable reduction in the conversion of gas oils induced by zeolites (e.g. Y-type zeolites) steamed with 100% steam is reported. As a concrete example, it is reported that the conversion is reduced to 78% by steaming at 760° C. for one hour, and to 72% by steaming at the same temperature for 12 hours.

As far as the known results teach, not only the above-described zeolites but also every type of zeolite, such as various high-silica zeolites, including ZSM-5 zeolites, zeolite A, zeolite X, zeolite Y and mordenite, have insufficient hydrothermal resistance and are apt to lose catalytic activity on exposure to the atmosphere of steam at high temperatures during catalytic reactions or during regeneration, and this is a serious problem not only in the catalytic cracking of petroleum hydrocarbons but also in any process using zeolites.

Zeolites involve another defect that they induce deep cracking (excessive cracking) easily when catalytic cracking of petroleum hydrocarbons is carried out in a highly active condition. Practically, when vacuum gas oils or atmospheric residue are catalytically cracked according to the MAT evaluation method by using a commercial zeolite catalyst (MRZ-204 produced by Shokubai Kasei Kogyo Kabushiki Kaisha), the results are unsatisfactory. That is, the yields of cracked gases and coke are high, and the yield of middle distillates of higher value are low. Middle distillates are liquid hydrocarbon oils having boiling points of not higher than 343° C. [fuel gasoline distillates (FG)+light cycle oils (LCO)] (refer to Comparative Examples described later). Further, in Japanese Patent Application Kokai Koho (Laid-open) No. 59-132939, it is disclosed that a low yield of (FG+LCO) of 66.5% results from the catalytic cracking of gas oils by using a proton-Y-type zeolite (REY) which comprises a rare-earth metal ion and were steamed at 795° C.

There are other reports of catalytic cracking of petroleum hydrocarbons by using clay minerals as catalysts other than zeolites, but these methods are not better than the above-described zeolites in the point of the low yield of (FG+LCO). For example, in Proc. 5th Int. Congr. Catal., p99 (1990), it is disclosed that a low yield of (FG+LCO) of 65.5% results from the catalytic cracking of a gas oil by using a catalyst which was prepared by ion-exchanged rectorite, which is a clay mineral having a high hydrothermal resistance, with Al polycation and calcining at 400° C. for 10 hours.

SUMMARY OF THE INVENTION

An object of the present invention is to provide a method for catalytic cracking of petroleum hydrocarbons which is extremely improved in process efficiency and produces high yields of useful middle distillates from various petroleum hydrocarbons. In order to accomplish the object, we considered it effective to use a novel catalyst which is so excellent in hydrothermal resistance as to lose very little catalytic functions, such as catalytic activity, even by steaming at high temperatures, for example, under regeneration conditions, thereby ensuring uniform cracking in repeated uses, and is as well so excellent in catalytic properties as to generate lesser cracked gases and coke due to deep cracking. By using such a catalyst, it becomes possible to produce high yields of liquid hydrocarbon oils having boiling points of 343° C. or lower [fuel gasoline distillates (FG)+ light cycle oils (LCO)] from hydrocarbon oil distillates having relatively high boiling points, such as vacuum gas oils or atmospheric residue.

In order to solve the above-described problems involved in the catalytic cracking of petroleum hydrocarbons, we made researches on novel catalysts which would replace the conventional zeolite catalysts or clay mineral catalysts. Consequently we found that the object of the present invention could be accomplished by using, as catalysts or catalyst components, cation-exchanged stevensites prepared by ion-exchanging specific clay mineral compounds (compositions), namely natural or synthetic stevensites, with proton or various active metal cations (mononuclear cations or polynuclear cations), and we have completed the present invention.

That is, the present invention provide a method for catalytic cracking of a petroleum hydrocarbon, which method comprises contacting the petroleum hydrocarbon at cracking conditions with a catalyst composition comprising a cation-exchanged stevensite.

PREFERRED EMBODIMENTS OF THE INVENTION

Examples of the petroleum hydrocarbon to be catalytically cracked in the present invention include various hydrocarbons and hydrocarbon distillates having various ranges of boiling points, which have been conventionally used in the fields of this kind. Preferred examples include hydrocarbon distillates having boiling points not lower than those of naphtha distillates, such as naphtha, kerosine, various gas oils and atmospheric residue. Particularly preferred are hydrocarbon oils having relatively high boiling points including vacuum gas oils and atmospheric residue, because they can be catalytically cracked in high yields to useful liquid fuel oils, such as fuel gasoline distillates (FG) or light cycle oils (LCO) having high value.

These hydrocarbons may be used individually or as a mixture of two or more of them, and the various distillates described above may be used individually or as a mixture of two or more of them.

The cation-exchanged stevensite to be used as a catalyst or a catalyst component for the catalytic cracking of the present invention is a stevensite containing a cation component (hereinafter, it will sometimes be called active cation) which can endow the stevensite with a sufficient activity of cracking petroleum hydrocarbons. It is obtainable easily by ion-exchanging stevensites of various compositions, which are originally inactive, with active cation components.

The stevensites may be natural ones, synthetic ones or mixtures thereof. Since the catalyst composition to be used in the present invention may contain other components as far as it contains the cation-exchanged stevensite, the stevensites to be ion-exchanged (cation-exchange) are not necessarily limited to pure stevensites.

For example, natural stevensites are generally compositions comprising stevensites and other components, such as clay minerals, and they may be used as catalyst materials as they are. Though synthetic stevensites can be produced in the form of stevensites of relatively high purity, they also may be used as compositions containing other components. That is, the stevensites subjected to the ion-exchange for introducing active cations may be pure stevensites or compositions comprising stevensites and other components.

In common with zeolites, there are stevensites of various compositions, and it is difficult to represent all by single general formula. Typical synthetic stevensites generally have the chemical structures represented by the following general formula (1)

$$E_{2x}Mg_{3-x}Si_4O_{10}(OH)_2 \tag{1}$$

wherein E represents an ion-exchangeable cation, and typical examples are $Na^+$ and $K^+$. Although E in the formula (1) is shown as a monovalent (+1) cation, the ion-exchangeable cation may be replaced partially or wholly by cations other than monovalent cations, for example by divalent cations. In the formula (1), x represents a real number of approximately 0 to 0.7. When x is 0, the formula (1) represents a stevensite having the chemical formula represented by the following formula (2)

$$[Mg_3Si_4O_{10}(OH)_2] \tag{2}$$

This stevensite cannot be directly ion-exchanged because of the absence of ion-exchangeable cations, such as E, but the catalyst composition may contain this stevensite as a catalyst component, or this stevensite may be converted into cation-exchangeable ones at the time of the preparation of the catalyst composition. Stevensites of the formula (1) wherein x is not 0 have ion-exchangeable cations, which can be partially or wholly ion-exchanged with various cations. That is, the stevensites wherein x is not 0 can generally be considered as compounds or compositions comprising the anion units represented by the general formula (3)

$$[Mg_{3-x}Si_4O_{10}(OH)_2)]^{2x-} \tag{3}$$

(in the formula (3), x is a real number of approximately 0 to 0.7 exclusive of 0) and various counter cations.

In common with zeolites, some stevensites are mixtures of isomorphous substances wherein a part of Mg or Si in formulas (1)–(3) are substituted by other metals, and these stevensites also can be used as the catalyst components or catalyst materials.

Natural stevensites and synthetic stevensites produced by conventional synthetic methods themselves exhibit generally no or poor catalytic activity in catalytic cracking, because they contain large quantities of inactive ions, such as $Na^+$ or $K^+$, as counter ions E or those corresponding to E. Such stevensites can be endowed with sufficient activity by introducing appropriate active ion components by ion-exchange, and thus the cation-exchanged stevensites to be used in the present invention can be obtained. Of course, when active cation components have been already introduced sufficiently in stevensites at the time of the synthesis of the stevensites, the stevensites themselves may be used as catalysts or catalyst components without further introduction of active cation components by ion-exchange.

Various cation-exchanged stevensites may be used as far as they contain active cations sufficiently, and some suitable examples include those which contain as a cation component at least one cation selected from the group consisting of a mononuclear cation of an element of Groups IA, IB, IIA, IIB, IIIA, IIIB, IVA, IVB, VA, VB, VIA or VIIIA of the Periodic Table and a polynuclear cation comprising at least one element of Groups IB, IIA, IIB, IIIA, IIIB, IVA, IVB, VA, VB, VIA or VIIIA of the Periodic Table. Preferred examples of the element of the mononuclear cation include H, Cu, Mg, Ca, Sr, Ba, Zn, La, Ce, Al, Ga, Ti, Zr, Ge, Sn, V, Nb, Bi, Cr, Mo, Fe, Co and Ni, and preferred examples of the element of the polynuclear cation include Cu, Mg, Ca, Sr, Ba, Zn, La, Ce, Al, Ga, Ti, Zr, Ge, Sn, V, Nb, Bi, Cr, Mo, Fe, Co and Ni. Particularly preferred are those containing proton, Al or La as a cation component.

The ratio of ion-exchange with proton or various active metal ions (mononuclear cations and/or polynuclear cations) in the cation-exchanged stevensites does not necessarily have to be 100%, and is generally at least 10%, preferably at least 50%. If the ratio of the active ions (the ratio of ion-exchange) is less than 5%, it sometimes becomes impossible to produce sufficient catalytic activity.

The various cation-exchanged stevensites containing active cations may be used individually or as a mixture of two or more of them or as a mixture or a composition of them with other stevensites having no or poor activity. As described above, they also may be used as a composition with other components than stevensites, such as binders.

The cation-exchanged stevensite to be used in the present invention may be produced by various methods, such as those employed conventionally in the production of cation-exchanged zeolites. In general, a suitable productive method is to ion-exchange inactive-cation-type stevensites, such as Na-type or K-type stevensites, with proton or the various active metal ions as described above.

The following is an example of the procedure for conducting the suitable method. The first step is preparation of an aqueous solution of a salt, such as nitrate, chloride or alkoxide, of the above-described active metal, an aqueous solution of an ammonium compound, such as ammonium chloride or ammonium nitrate, an aqueous solution of a mineral acid, such as diluted hydrochloric acid or diluted nitric acid, or a solution mixture of two or more of them. These may be used as ion-exchanging raw liquids as they are, or may be used after aged for several weeks or less at temperatures ranging from room temperature to 100° C. Thus obtained ion-exchanging raw liquid is then mixed with a stevensite (which, as described above, may be of an inactive-metal-type, such as Na-type or K-type) or a composition containing it, and ion-exchanging is then carried out at temperatures ranging from room temperature to 100° C. for 5 minutes to several weeks. There is no limitation in the form of the stevensite or the composition containing which is added to the ion-exchanging raw liquid. In order to perform uniform ion-exchange in a short time, it is preferable to use a stevensite of powdery form or slurry form. The concentration of the active component, such as the above-described metal salts, ammonium compounds or mineral acids, in the ion-exchanging raw liquid is not limited, and it preferably ranges from 0.01 to 1 mol/l.

Thus obtained is a stevensite which has been ion-exchanged sufficiently with active metal ions, proton or ammonium ion, which is a precursor of proton, or a composition containing the stevensite. Thus obtained solid is separated from the liquid, for example, by filtration, and then, according to demand, washed with a wash, such as water, alcohols or a mixture of water and alcohols, and dried by a common method. The drying may be carried out by air drying or by other methods, such as freeze drying.

After the above-described washing and drying, the solid, according to demand, may be further ion-exchanged by using the same or different ion-exchanging raw liquids in the same manner as described above, or may be aged at temperatures ranging from room temperature to 100° C. for several weeks or less.

The dried solid obtained thus may be used as a catalyst as they are, and in a case where the solid is in a powdery form requiring forming, the powdery solid is formed into a desired form in a conventional manner by using a binder, for example, clay minerals, such as alumina, silica or kaolin. The quantity of the binder used is generally 0 to 99% by weight, preferably 10 to 90% by weight, based on the total of the dried solid and the binder.

Although the ion-exchange is preferably carried out by using a stevensite of powdery form or slurry form for the purposes of uniform and efficient ion-exchange, the form of the material stevensite is not limited to powdery or slurry form, and a stevensite formed by using a binder in the manner as described above may also be used.

Thus obtained products containing cation-exchanged stevensites, such as the formed product, were confirmed to have, in general, suitable surface areas (measured by BET method) ranging from 100 to 800 $m^2/g$ as measured after drying overnight in the air at 120° C. By measurements according to a powder X-ray method, these products were confirmed to have $d_{001}$ of 0.94 to 2.8 nm.

Though thus obtained cation-exchanged stevensites or compositions containing them, particularly formed products thereof can be used suitably as catalysts in the method of the present invention, they, according to demand, may be calcined, for example, in an atmosphere of the air prior to their use for the catalytic cracking. For example, stevensites ion-exchanged with ammonium ion can be converted easily to proton-exchanged stevensites (H-type stevensites) by air-calcining. They also may be activated in the atmosphere of an inert gas, such as nitrogen, or in the stream of a steam-containing gas or a hydrogen-containing gas.

Although the method described above is suitable for the production of the catalyst compositions containing cation-exchanged stevensites, the method of producing the catalyst compositions is not limited to this method.

The cation-exchanged stevensites are highly active in the catalytic cracking of various hydrocarbons because of the proton or active metal ions contained therein, and their stevensite structures inhibit sufficiently the generation of coke and cracked gases due to deep cracking during the catalytic cracking, so that they exhibit such excellent catalytic properties as to produce high yields of middle distillates of high value. Further, the cation-exchanged stevensites have far better hydrothermal resistance as compared with the conventional zeolites and exhibit sufficient stability against steaming at high temperatures. Consequently, the catalyst compositions comprising the cation-exchanged stevensites to be used in the method of the present invention lose little catalytic activity (catalytic functions) even after repeated regenerations using steam-containing gases, and therefore have longer life-time in their use as catalysts.

In the method of the present invention, desired useful hydrocarbon distillates are produced by catalytic cracking of various hydrocarbons, such as the hydrocarbon distillates exemplified above, by using as a catalyst, a composition comprising at least one of the cation-exchanged stevensites described above.

There is no particular limitation in the reaction apparatuses and reaction systems, and it is possible to use those conventionally used for the catalytic cracking of petroleum hydrocarbons. For example, the catalytic cracking is suitably conducted by continuous processes using fixed beds, moving beds or fluidized beds. In particular, continuous production systems using fluidized beds are suitable for the method of the present invention since the above-described catalyst composition is so excellent in hydrothermal resistance as to be applicable to fluidized-bed processes.

The catalytic cracking is generally carried out at a temperature of 390° to 710° C., preferably 420° to 600° C. Temperatures lower than 390° C. may induce low conversion because of low reaction rate. Temperatures higher than 710° C. may induce hard deep cracking, causing disadvantages including an increased generation of cracked gases of low value and a rapid decrease in the activity due to coking.

The reaction pressure is generally 0 to 11 kg/cm$^2$G, preferably 0 to 4.0 kg/cm$^2$G. If the reaction pressure is higher than 11 kg/cm$^2$G, efficient operation may become difficult depending on the materials of reaction apparatuses.

According to demand, the catalystic cracking may be carried out in the presence of other components, such as hydrogen or steam, fed together with the hydrocarbons.

Thus, high yields of middle distillates of high value can be produced efficiently from the hydrocarbons, such as the hydrocarbon distillates as described above, and, for example, particularly valuable fuel gasoline distillate (FG) and light cycle oils (LCO) can be obtained efficiently in high yields from vacuum gas oils or atmospheric residue. Of course, other distillates including LPG distillates are also produced by the method of the present invention. However, because of the use of the specific catalyst component, namely the cation-exchanged stevensites, deep cracking is lesser than in the conventional cracking using zeolite catalysts, and the generation of cracked gas distillates of low value including LPG and coke is relatively small. This is the reason why the method of the present invention can produce stably and efficiently fuel gasoline distillates and light cycle oils (LCO) in high yields.

Further, because the cation-exchanged stevensites have such a good hydrothermal resistance as to be stable against steaming, the catalyst composition containing them as active components and used in the present invention loses extremely lesser catalytic activity during conventional regeneration with steam-containing gases as compared with the conventional zeolite catalysts, thereby permitting longer-term continuous operation including repeated reactions and regenerations.

The present invention will be described in detail referring to Examples and Comparative Examples, but the scope of the present invention is not limited to the Examples.

EXAMPLES 1 to 11 AND COMPARATIVE EXAMPLES 1 TO 3

EXAMPLE 1

(A) Preparation of a catalyst and evaluation of its properties

Catalyst Preparation

To two litters of 1N aqueous NH$_4$Cl solution added was 20 g of powdered Na-stevensite (Trade name: IONITE T, produced by Mizusawa Kagaku Kogyo K. K.) and was then dispersed sufficiently by stirring the mixture at 80° C. for two hours. The mixture was then filtered, and the obtained solid was washed with pure water and alcohol and was then air-dried at 120° C. The properties of the obtained sample (ammonium ion-exchanged stevensite) are listed in Table 1.

TABLE 1

| Total surface area | 508 m$^2$/g |
|---|---|
| External surface area | 25 m$^2$/g |
| Internal surface area | 483 m$^2$/g |
| Pore volume | 0.31 ml/g |

Thus obtained NH$_4$$^+$-type stevensite was calcined in an air stream at 400° C. for two hours, to obtain proton-exchanged stevensite (the rate of ion-exchange: 100%)

(B) Steaming evaluation

Thus obtained proton-exchanged stevensite was steamed (650° C., 10 h, steam: 20%). In Table 2 listed are the crystallinities of the proton-exchanged stevensite obtained from the X-ray diffraction peak intensities measured before and after the steaming (the crystallinity of the proton-exchanged stevensite before the steaming was represented by 100 to be the standard value of the crystallinity).

TABLE 2

|  | Example 1 Proton-exchanged stevensite | Comparative Example 1 Zeolite contained in MRZ-204 |
|---|---|---|
| Before steaming | 100 | 100 |
| After steaming | 138 | 76 |

(C) Evaluation of reaction results

The hydrocarbon feed (VGO) shown in Table 3 was catalytically cracked by using the proton-exchanged stevensite obtained in Catalyst Preparation (A), and the reaction results were evaluated. The reaction and the evaluation of the results were made by MAT method according to ASTM(D-3907) under the conditions of a feed oil (VGO) feeding rate of 1.33 g/75 sec, a quantity of the catalyst used of 4 g, a ratio of catalyst/VGO of 3.33 g/g and a reaction temperature of 482° C.

TABLE 3

| API specific gravity | 27.6 |
|---|---|
| Total nitrogen | 875 ppm |
| Basic nitrogen | 281 ppm |
| Sulfur | 0.64 wt % |
| Conradson carbon | 0.18 wt % |
| Ramsbottom carbon | 0.21 wt % |
| Refractive index | 1.4772 (67° C.) |
| Aniline point | 83° C. |
| Distillation data (according to ASTM D1160) | |
| Initial boiling point | 82° C. |
| 5 vol % | 142° C. |
| 10 vol % | 166° C. |
| 20 vol % | 190° C. |
| 30 vol % | 211° C. |
| 40 vol % | 229° C. |
| 50 vol % | 248° C. |
| 60 vol % | 270° C. |
| 70 vol % | 292° C. |
| 80 vol % | 317° C. |
| 90 vol % | 347° C. |
| 95 vol % | 368° C. |
| Final boiling point | 379° C. |

Typical examples of the obtained results are listed in Table 4.

The MAT method means micro activity test method, which is a standard technique of the method for evaluating the petroleum hydrocarbon cracking activity of catalysts.

TABLE 4

| Yields | Example 1 | Comparative Example 1 | Examples 2 | 3 | 4 | 5 |
|---|---|---|---|---|---|---|
| $H_2$ | 0.03 | 0.17 | 0.03 | 0.03 | 0.05 | 1.19 |
| Cracked gas | 3.90 | 20.17 | 4.21 | 3.13 | 7.33 | 7.41 |
| FG[1] | 35.8 | 35.8 | 33.9 | 31.6 | 49.9 | 35.6 |
| LCO[2] | 38.9 | 15.7 | 42.2 | 39.5 | 27.3 | 26.1 |
| HCO[3] | 14.5 | 10.0 | 16.8 | 18.0 | 4.1 | 4.4 |
| FG + LCO | 74.7 | 51.5 | 76.1 | 71.1 | 77.2 | 61.7 |
| Coke | 3.8 | 11.9 | 4.5 | 1.7 | 7.5 | 16.9 |

[1] liquid components having boiling points of 216° C. or lower
[2] liquid components having boiling points of 216 to 343° C.
[3] liquid components having boiling points of 343° C. or higher

COMPARATIVE EXAMPLE 1

Steaming evaluation and evaluation of reaction results were made in the same manner as in Example 1 with the exception that a commercial zeolite catalyst for FCC (MRZ-204, produced by Shokubai Kasei Kogyo K. K.) was used in place of the proton-exchanged stevensite catalyst used in Example 1.

Before and after steaming, the crystallinities of the commercial catalyst were evaluated from the Y-zeolite contents obtained by X-Ray diffraction, and the results are listed in Table 2. The crystallinities listed in Table 2 are the relative values obtained by representing the crystallinities of the catalysts before steaming by a value of 100 and calculating the relative values on the basis of the value 100. The results of evaluation of the reaction results obtained by using the commercial catalysts are listed in Table 4.

EXAMPLE 2

Evaluation of reaction results were made in the same manner as in Example 1 with the exception that a Mg-exchanged stevensite (the rate of ion-exchange: 100%) was used in place of the proton-exchanged stevensite used in Example 1. The results are listed in Table 4.

EXAMPLE 3

Catalyst Preparation

To two litters of 0.1M aqueous $La(NO_3)_3.6H_2O$ solution added was 20 g of powdered Na-stevensite (Trade name: IONITE T, produced by Mizusawa Kagaku Kogyo K. K.) and was then dispersed sufficiently by stirring the mixture at 80° C. for two hours. The mixture was then filtered, and the obtained solid was washed with pure water and alcohol and was then air-dried at 120° C., to obtain a La-exchanged stevensite (the rate of ion-exchange: 100%).

Evaluation of reaction results

Evaluation of reaction results were made in the same manner as in Example 1 with the exception that the La-exchanged stevensite described above was used in place of the proton-exchanged stevensite used in Example 1. The results are listed in Table 4.

EXAMPLE 4

Catalyst Preparation

To two litters of 0.1M aqueous $AlCl_3.6 H_2O$ solution added was 20 g of powdered Na-stevensite (Trade name: IONITE T, produced by Mizusawa Kagaku Kogyo K. K.) and was then dispersed sufficiently by stirring the mixture at 80° C. for two hours. The mixture was then filtered, and the obtained solid was washed with pure water and alcohol and was then air-dried at 120° C., to obtain an Al-exchanged stevensite (the rate of ion-exchange: 100%).

Evaluation of reaction results

Evaluation of reaction results were made in the same manner as in Example 1 with the exception that the Al-exchanged stevensite described above was used in place of the proton-exchanged stevensite used in Example 1. The results are listed in Table 4.

EXAMPLE 5

Evaluation of reaction results were made in the same manner as in Example 1 with the exception that an Fe-exchanged stevensite (the rate of ion-exchange: 100%) was used in place of the proton-exchanged stevensite used in Example 1. The results are listed in Table 4.

EXAMPLE 6

Evaluation of reaction results were made in the same manner as in Example 1 with the exception that a Zr-exchanged stevensite (the rate of ion-exchange: 100%) was used in place of the proton-exchanged stevensite used in Example 1. The results are listed in Table 5.

EXAMPLE 7

Evaluation of reaction results were made in the same manner as in Example 1 with the exception that a Sr-exchanged stevensite (the rate of ion-exchange: 100%) was used in place of the proton-exchanged stevensite used in Example 1. The results are listed in Table 5.

EXAMPLE 8

Evaluation of reaction results were made in the same manner as in Example 1 with the exception that a kneaded product of the Al-exchanged stevensite obtained in Example 4 and $SiO_2$ (weight ratio: 50:50) was used in place of the proton-exchanged stevensite used in Example 1. The results are listed in Table 5.

EXAMPLE 9

Evaluation of reaction results were made in the same manner as in Example 1 with the exception that a kneaded product of the Al-exchanged stevensite obtained in Example 4 and $Al_2O_3$ (weight ratio: 50:50) was used in place of the proton-exchanged stevensite used in Example 1. The results are listed in Table 5.

EXAMPLE 10

Evaluation of reaction results were made in the same manner as in Example 1 with the exception that the kneaded product of the Al-exchanged stevensite and $Al_2O_3$ (weight ratio: 50:50) used in Example 9 was used after it had been steamed (760° C., 6 h, steam: 100%). The results are listed in Table 6 together with the results of the reaction result evaluation of Example 9.

COMPARATIVE EXAMPLE 2

Evaluation of reaction results were made in the same manner as in Example 1 with the exception that the commercial zeolite catalyst for FCC (Trade name: MRZ-204, produced by Shokubai Kasei Kogyo K. K.) used in Comparative Example 1 was used after it had been steamed (760° C., 6 h, steam: 100%). The results are listed in Table 6 together with the results of the reaction result evaluation of Comparative Example 1.

EXAMPLE 11

Evaluation of reaction results were made in the same manner as in Example 1 with the exception that the proton-exchanged stevensite used in Example 1 was used after it had been steamed (650° C., 100 h, steam: 10%). The results are listed in Table 7 together with the results of the reaction result evaluation of Example 1.

COMPARATIVE EXAMPLE 3

Evaluation of reaction results were made in the same manner as in Example 1 with the exception that the commercial zeolite catalyst for FCC (Trade name: MRZ-204, produced by Shokubai Kasei Kogyo K. K.) used in Comparative Example 1 was used after it had been steamed (650° C., 100 h, steam: 10%). The results are listed in Table 7 together with the results of the reaction result evaluation of Comparative Example 1.

TABLE 5

| Yields | Examples | | | |
|---|---|---|---|---|
|  | 6 | 7 | 8 | 9 |
| $H_2$ | 0.05 | 0.02 | 0.03 | 0.10 |
| Cracked gas | 6.10 | 2.20 | 6.50 | 6.80 |
| FG[1] | 42.7 | 19.2 | 43.6 | 41.6 |
| LCO[2] | 36.4 | 43.5 | 35.0 | 27.3 |
| HCO[3] | 9.9 | 31.3 | 10.5 | 10.6 |
| FG + LCO | 79.1 | 62.7 | 78.6 | 68.9 |
| Coke | 3.1 | 4.0 | 4.5 | 5.9 |

[1] liquid components having boiling points of 216° C. or lower
[2] liquid components having boiling points of 216 to 343° C.
[3] liquid components having boiling points of 343° C. or higher

TABLE 6

|  | Conversion[4] (%) | | Hydrothermal resistance ($C_S/C_F$) |
|---|---|---|---|
|  | Before steaming ($C_F$) | After steaming ($C_S$) |  |
| Examples 9, 10 | 54.4 | 44.6 | 0.82 |
| Comparative Examples 1, 2 | 68.1 | 47.5 | 0.70 |

[4] Yield of ($H_2$ + Cracked gases + FG + Coke)

TABLE 7

|  | Conversion[4] (%) | | Hydrothermal resistance ($C_S/C_F$) |
|---|---|---|---|
|  | Before steaming ($C_F$) | After steaming ($C_S$) |  |
| Examples 1, 11 | 43.5 | 43.4 | 1.00 |
| Comparative Examples 1, 3 | 68.1 | 64.4 | 0.95 |

[4] Yield of ($H_2$ + Cracked gases + FG + Coke)

The results listed in Tables 4 and 5 show that, as compared with the commercial zeolite catalyst (MRZ-204) used in Comparative Example 1, the cation-exchanged stevensites used in Examples provided higher yields of liquid hydrocarbon oils [fuel gasoline distillates (FG)+ light cycle oils (LCO)] having boiling point of 343° C. or lower.

The results listed in Tables 6 and 7 show that, as compared with the commercial zeolite catalyst, the cation-exchanged stevensites have better hydrothermal resistance.

What is claimed is:

1. A method for catalytic cracking of a petroleum hydrocarbon, comprising: contacting the petroleum hydrocarbon at cracking conditions with a catalyst composition comprising a cation-exchanged stevensite, wherein the cation-exchanged stevensite contains as a cation component at least one cation selected from the group consisting of a mononuclear cation of an element selected from the group consisting of H, Cu, Mg, Ca, Sr, Ba, Zn, La, Ce, Al, Ga, Ti, Zr, Ge, Sn, V, Nb, Bi, Cr, Mo, Fe, Co or Ni, and a polynuclear cation of an element selected from the group consisting of Cu, Mg, Ca, Sr, Ba, Zn, La, Ce, Al, Ga, Ti, Zr, Ge, Sn, V, Nb, Bi, Cr, Mo, Fe, Co and Ni.

2. The method as claimed in claim 1, wherein the catalytic cracking of the petroleum hydrocarbon is carried out at a reaction temperature of 390° to 710° C. at a reaction pressure of 0 to 11 kg/cm$^2$G.

3. The method as claimed in claim 2, wherein the element of the mononuclear cation is selected from the group consisting of H, Mg, Sr, La, Al, Zr and Fe, and the element of the polynuclear cation is selected from the group consisting of Mg, Sr, La, Al, Zr and Fe.

4. The method as claimed in claim 2, wherein the cation-exchanged stevensite is a cation-exchanged synthetic stevensite.

5. The method as claimed in claim 3, wherein the cation-exchanged stevensite is Al-exchanged synthetic stevensite.

6. The method as claimed in claim 3, wherein the cation-exchanged stevensite is La-exchanged synthetic stevensite.

7. The method as claimed in claim 2, wherein the catalyst composition further comprises a clay mineral as a binder in a quantity of 10 to 90% by weight based on the total of the catalyst composition.

8. The method as claimed in claim 5, wherein the element of the mononuclear cation is selected from the group consisting of H, Mg, Sr, La, Al, Zr and Fe, and the element of the polynuclear cation is selected from the group consisting of Mg, Sr, La, Al, Zr and Fe.

9. The method as claimed in claim 6, wherein the cation-exchanged stevensite is selected from the group consisting of Al-exchanged synthetic stevensite and La-exchanged synthetic stevensite, and the binder is selected from the group consisting of silica, alumina, kaolin and a mixture thereof.

10. The method as claimed in claim 7, wherein the cation-exchanged stevensite is Al-exchanged synthetic stevensite, and the binder is alumina.

11. The method as claimed in claim 1, wherein the petroleum hydrocarbon is at least one selected from the group consisting of naphtha, kerosine, gas oils, atmospheric residue and vacuum oils.

12. The method as claimed in claim 9, wherein a fuel gasoline distillate or a light cycle oil having a boiling point of 343° C. or lower is produced.

13. The method as claimed in claim 10, wherein the stevensite is of the formula $E_{2x}Mg_{3-x}Si_4O_{10}(OH)_2$ wherein E is an ion-exchangeable cation and x is 0 to 0.7.

14. The method as claimed in claim 11, wherein the ratio of ion-exchange of the cations in the cation-exchanged stevensite is at least 10%.

15. The method as claimed in claim 11 wherein the ratio of ion-exchange of the cations in the cation-exchanged stevensite is at least 50%.

16. The method as claimed in claim 13, wherein the cation-exchange stevensite has a surface area as determined by the BET method of 100 to 800 m$^2$/g and a d$_{001}$ of 0.94 to 2.8 m.

17. The method as claimed in claim 14, wherein the cracking is carried out at a temperature of 390° to 710° C. and at a pressure of 0 to 11 kg/cm$^2$G.

18. The method as claimed in claim 14, wherein the cracking is carried out at a temperature of 420° to 600° C. and at a pressure of 0 to 4 kg/cm$^2$G.

* * * * *